United States Patent [19]

Minden

[11] Patent Number: 5,488,620
[45] Date of Patent: Jan. 30, 1996

[54] PASSIVELY MODE LOCKED-LASER AND METHOD FOR GENERATING A PSEUDO RANDOM OPTICAL PULSE TRAIN

[75] Inventor: Monica L. Minden, Calabasas, Calif.

[73] Assignee: Hughes Aircraft Company, Los Angeles, Calif.

[21] Appl. No.: 369,050

[22] Filed: Jan. 5, 1995

[51] Int. Cl.$^6$ ............................................. H01S 3/098
[52] U.S. Cl. ........................... 372/18; 372/11; 372/6; 372/25; 372/31
[58] Field of Search ........................... 372/18, 19, 31, 372/11, 6, 23, 69, 75; 376/102, 29

[56] References Cited

U.S. PATENT DOCUMENTS 5,131,069  3/1995  Hall et al. ................................ 372/6

OTHER PUBLICATIONS

Lee and Ramaswami, "Study of Pseudo Noise CW diode laser for ranging application", *Proceedings of the SPIE: Cooperative Intelligent Robotics in Space III*, vol. 1829, 1992, pp. 36–45 (No Month).

Takeuchi et al., "Random modulation cw lidar", *Applied Optics*, vol. 22, No. 9, May 1, 1983, pp. 1382–1386.

O'Shea et al., "Introduction to Lasers and Their Application", *Addison–Wesley*, 1978, pp. 120–123. (No Month).

Hill et al., "Bragg gratings fabricated in monomode photosensitive optical fiber by UV exposure through a phase mask", *Applied Physics Letters*, vol. 62, No. 10, Mar. 8, 1993, pp. 1035–1037.

Keller et al., "Passively mode–Locked ND:YLF and ND:YAG lasers using a new intracavity antiresonant semiconductor Fabry–Perot", *OSA Proceedings on Advanced Solid–State Lasers*, vol. 13, 1992, pp. 98–100. (No Month).

*Primary Examiner*—Leon Scott, Jr.
*Attorney, Agent, or Firm*—Vijayalakshmi D. Duraiswamy; Wanda K. Denson-Low

[57] ABSTRACT

A passively mode-locked laser and method for generating a coherent pseudo random pulse train is disclosed. The laser comprises an optical resonant cavity that is capable of sustaining the oscillation of a plurality of resonant modes having respective phases. A saturable absorber is positioned in the resonant cavity and has an optical intensity threshold beyond which multiple mode-locked pulses with random starting times are generated in the resonant cavity and periodically emitted by the laser. A pump injects power into the resonant cavity at a level at which the optical intensity that is incident on the saturable absorber exceeds the optical intensity threshold.

19 Claims, 2 Drawing Sheets

PASSIVELY MODE LOCKED-LASER AND METHOD FOR GENERATING A PSEUDO RANDOM OPTICAL PULSE TRAIN

BACKGROUND OF THE INVENTION

1. Field of the Invention

The present invention generally relates to generating pseudo random optical pulse trains, and more specifically to a passively mode-locked laser and method for generating pseudo random optical pulse trains.

2. Description of the Related Art

Target detection systems such as LAser raDAR (LADAR) transmit pseudo random optical pulse trains to track moving targets. Pseudo random optical pulse trains are presently generated by actively modulating each period of a CW (continuous wave) laser with a pseudo random noise (PN) code. The PN code is a random binary code that can be obtained by quantizing the output of a random noise generator. The CW laser is actively modulated by modulating its input power or electrooptically shuttering the light inside the laser cavity in accordance with the PN code. These systems are typically complicated, heavy and expensive.

Lee and Ramaswami, "Study of Pseudo Noise CW diode laser for ranging applications," *Proceedings of the SPIE: Cooperative Intelligent Robotics in Space III*, Vol. 1829, 1992, pp. 36–45 disclose a PN modulated CW diode laser for generating pseudo random optical pulse trains. Takeuchi et al, "Random modulation cw lidar," *Applied Optics*, Vol. 22, No. 9, May 1, 1983, pp. 1382–1386 disclose an electro-optical modulator that modulates the input power of a diode laser with a binary code to produce a pseudo random pulse train. The amplitude modulation can be superimposed on top of a frequency modulation to detect both the range and velocity information of a target without ambiguity. In both the Lee and Takeuchi systems, the pulse train is generated by actively modulating a laser diode. In these systems, the bandwidth of the laser diode output is too broad for many applications.

O'Shea et al, "Introduction to Lasers and Their Applications," *Addison-Wesley*, 1978, pp. 120–123 disclose a mode-locked laser for producing high-power, short-duration regularly spaced pulses. In a CW laser, the phases of the modes in the laser cavity fluctuate randomly so that the laser generates a fairly uniform output. In the mode-locked laser, the laser is modulated, either actively or passively, to force the modes to have substantially the same phase, i.e. mode-locked. The mode-locked modes form a Fourier sequence such that the superposition of the modes produces a single optical pulse during each laser period. The resulting pulse train is comprised of regularly spaced pulses that are separated by the period of the laser. The period of the laser is defined as the round trip time for light in the laser cavity and is proportional to the length of the cavity. The laser period and time between pulses increase as the length of the cavity increases. The pulse width is determined by the number of lasing modes and is reduced as the number of modes, i.e., the frequency content, is increased. LADAR systems that transmit regularly spaced pulses can either resolve the target's range or velocity; closer spaced pulses improve velocity resolution but reduce range resolution and vice versa.

SUMMARY OF THE INVENTION

The present invention provides a simple, light weight and inexpensive passively mode-locked laser and method for generating multiple coherent mode-locked pulses with random starting times. This is accomplished with an optical resonant cavity that is capable of sustaining the oscillation of a plurality of resonant modes having respective phases. A saturable absorber is positioned in the resonant cavity and has an optical intensity threshold beyond which multiple mode-locked pulses with random starting times are generated in the resonant cavity and emitted by the laser. A pump injects power into the resonant cavity at a sufficiently high level such that the optical intensity that is incident on the saturable absorber exceeds its optical intensity threshold.

For a better understanding of the invention, and to show how the same may be carried into effect, reference will now be made, by way of example, to the accompanying drawings.

DETAILED DESCRIPTION OF THE INVENTION

The present invention provides a passively mode-locked laser for generating a coherent pseudo random pulse train. A pseudo random pulse train comprises a random pattern of pulses that are emitted during each period of the laser and that generally repeat from period-to-period. The passively mode-locked laser is simpler, lighter weight and less expensive then an actively modulated laser. The preferred embodiment of the invention is described with respect to a fiber optic laser. However, the applicant believe the invention is applicable to other types of lasers such as gas or dye lasers.

Figure 1:
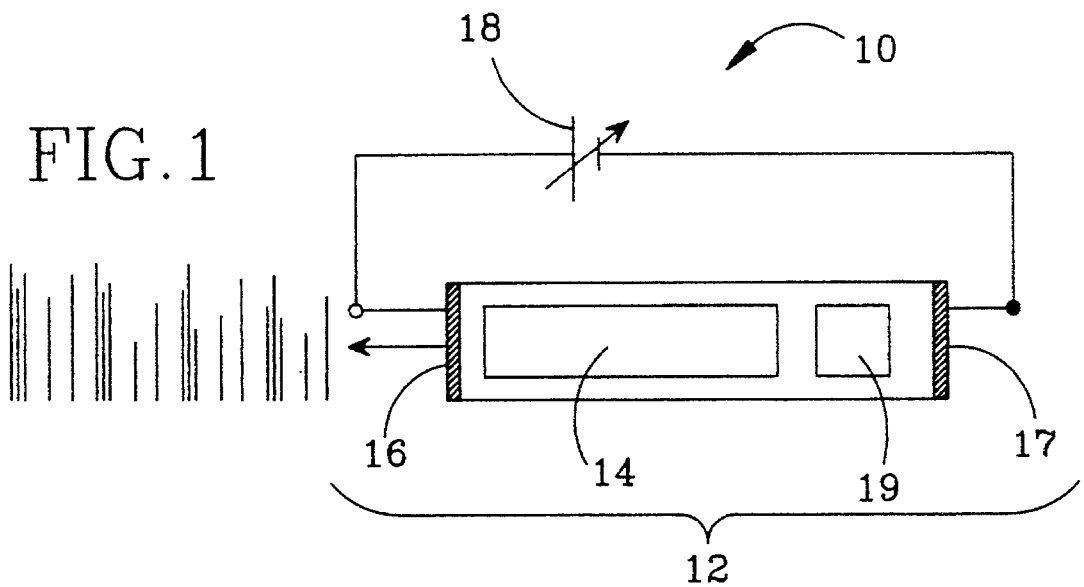
FIG. 1 is a simplified diagram of a passively mode-locked laser in accordance with the invention.

FIG. 1 is a simplified diagram of a passively mode-locked laser 10. The laser's optical resonant cavity 12 comprises an active gain medium 14 that is interposed between reflectors 16 and 17. A controllable power supply 18 pumps power into the cavity at a level sufficient to maintain the population inversion in the active medium needed to sustain steady-state oscillation at a plurality of lasing modes. The active gain medium emits light across a continuous band of frequencies, and the laser amplifies those frequencies that correspond to the resonant modes of the cavity such that each mode corresponds to a different discrete frequency with some phase.

A saturable absorber 19 is positioned in the cavity 12 to mode-lock the resonant modes by forcing them to have approximately the same phase. Mode-locking occurs because the loss in the saturable absorber as a percentage of the incident optical intensity is reduced as the optical intensity in the cavity is increased. Since a laser inherently oscillates at its lowest loss state, the laser will prefer a high intensity pulse to a relatively low intensity CW output. The saturable absorber has the effect of concentrating the optical energy in time, which tends to form a single high intensity pulse to maximize the laser's efficiency. One type of saturable absorber that is typically used in lasers is a bleachable dye whose opacity decreases with increasing optical intensity. Hence, the saturable absorber will absorb less power from a mode-locked pulse train than from a continuous wave.

Figure 2:
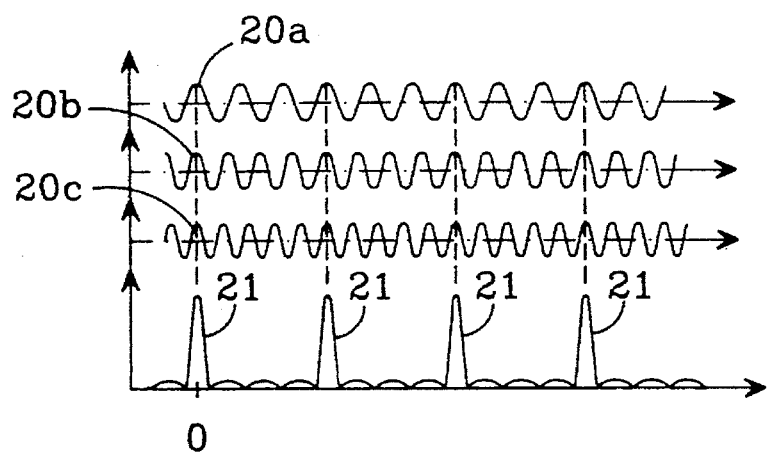
FIG. 2 is a plot of three in-phase laser modes and the resulting mode-locked pulse.

By way of example, FIG. 2 is a plot of three in-phase tasing modes 20a–c, and the mode-locked pulses 21 created by their superposition. The pulses are spaced apart by the period of the laser. If the saturable absorber was removed, the phases would be random and the laser output would be relatively uniform.

Figure 3:
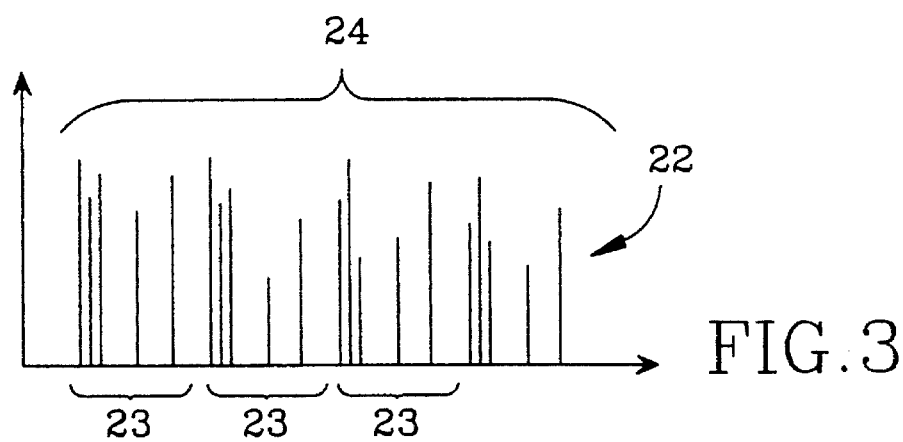
FIG. 3 is a plot of a pseudo random pulse train that can be generated by the mode-locked laser shown in FIG. 1.

The applicant has discovered that the saturable absorber has a threshold beyond which the laser produces multiple mode-locked pulses with random starting times during each laser period. The pumping power is set such that the optical intensity which is incident on the saturable absorber 19 exceeds this threshold. The pumping power is adjustable to select a predetermined number of pseudo random pulses in the laser period. The number of pulses increases as the optical intensity incident on the saturable absorber increases past the threshold value. As shown in FIG. 3, the random pulse pattern 22 changes slowly from period-to-period 23 due to fluctuations in the laser 10 to produce a pseudo random pulse train 24.

The applicant believes that the N pulses in each period of the pseudo random pulse train 24 can be viewed as N Fourier series with random relative phases which correspond to the respective random starting times of the pulses within each Fourier series the modes have a definite phase relation to each other, thus forming a mode locked pulse. Each mode can be described as the superposition of N randomly phased components, one from each pulse or Fourier series. The amplitude and phase of each mode is determined by the superposition of the component amplitudes and phases.

The applicant believes that the multiple mode-locked pulses with random starting times are caused by a secondary loss mechanism in the laser that tends to distribute the laser's optical power over time. The secondary loss mechanism may be caused by the fluorescence of the lasing ions in the active gain medium between successive pulses. The laser loses slightly more energy to fluorescence when the lasing ions see only an occasional pulse as compared to frequent pulses, and thus prefers a multiple pulse output.

The effects of the secondary loss mechanism are not seen in the normal operating range of a mode-locked laser because of the shape of the loss curve for the saturable absorber. In the normal operating range, a small increase in optical intensity substantially reduces the loss in the saturable absorber, and hence the loss in the laser. However, at higher power levels the loss curve flattens out such that the benefits of increasing the intensity of the pulse are reduced. The laser attempts to minimize the sum of the two opposing loss mechanisms to maximize its efficiency. At the threshold, the laser's minimum loss state will switch from a single higher intensity pulse to two lower intensity pulses. As the pumping power is increased past the threshold level, the laser encounters successive thresholds between, in general, n relatively higher intensity pulses and n+1 lower intensity pulses. When the optical intensity on the saturable absorber exceeds the nth threshold, the laser minimizes its losses by generating n+1 pulses.

Figure 4:
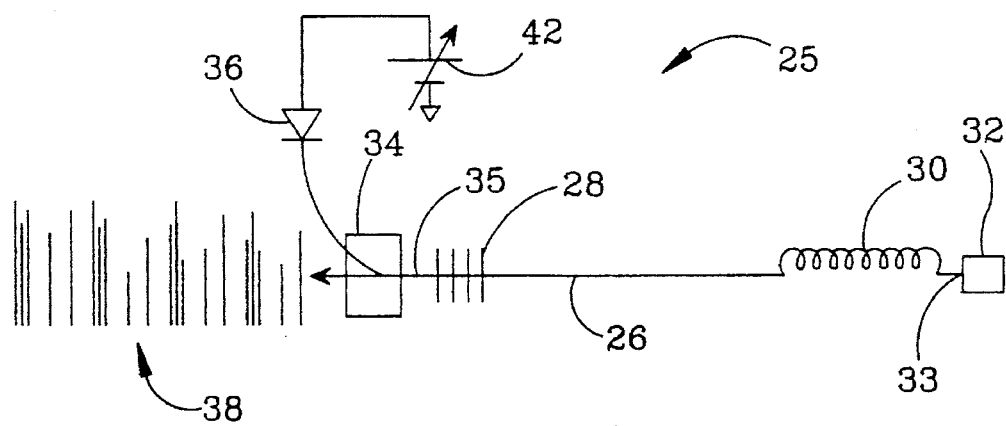
FIG. 4 is a diagram of a preferred embodiment of a passively mode-locked optical fiber laser for generating a pseudo random pulse train.

As shown in FIG. 4, the preferred embodiment of the invention is a passively mode-locked fiber optic laser 25. The laser comprises a length of optical fiber 26, suitably 1.2 meters of AT&T EDF-HC fiber, that is doped to provide a laser gain medium. The fiber 26 is preferably doped with erbium to provide a central lasing wavelength of approximately 1.5 µm. Wavelengths greater than approximately 1.5 µm are considered "eyesafe" which is preferred in laser radar systems. Furthermore, the absorption in the glass cladding around an optical fiber is minimized at 1.5 µm. The fiber is also doped with germanium so that a grating 28 can be imprinted on the fiber 26 to select the approximate operating frequency, control the bandwidth, and output couple the laser energy. Typically, the grating selects a number of pulses such that the pulse width is between 0.2 and 1 ns. The grating can be imprinted using ultra-violet exposure through a phase mask following the technique described in Hill et. al, "Bragg gratings fabricated in monomode photosensitive optical fiber by UV exposure through a phase mask," *Applied Physics Letters*, Vol. 62, No. 10, Mar. 8, 1993, pp. 1035–1037.

The optical fiber 26 is spliced to a dispersion shifted fiber (DSF) 30, suitably 100 meters of AT&T DSF, to increase the length of the laser's resonant cavity, and thus lengthen the period of the laser. DSFs allow the zero dispersion wavelength to be shifted from 1.3 µm to 1.5 µm such that both the dispersion and cladding losses can be minimized. A nonlinear reflector 32 is coupled to the end 33 of fiber 30. The nonlinear reflector combines the functions of the standard linear reflector 17 and the saturable absorber 19 shown in FIG. 1, and exhibits a similar threshold beyond which the laser emits multiple pulses with random starting times. As shown in detail in FIG. 5, the reflectivity of the nonlinear reflector 32 increases, and hence its loss decreases, as the optical intensity increases.

Keller et. al., "Passively mode-Locked ND:YLF and ND:YAG lasers using a new intracavity antiresonant semiconductor Fabry-Perot", *OSA Proceedings on Advanced Solid-State Lasers*, Vol. 13, 1992, pp. 98–100 disclose a suitable semiconductor saturable absorber to provide the nonlinear reflector 32. The disclosed Antiresonant Fabry Perot Saturable Absorber (A-FPSA) has a low-temperature molecular beam epitaxy (MBE) grown InGaAs/GaAs semiconductor saturable absorber, with a bandgap ~1.5 µm, that is monolithically integrated between two reflecting mirrors. Other types of semiconductor saturable absorbers can be used in the fiber optic laser.

An optical input/output coupler 34 is connected to the end 35 of fiber 26. Gould Fiber Optics of Glen Burnie, Md. produces a wavelength division multiplexer #40-20798-55 that provides a suitable coupler. The coupler 34 input couples a CW diode pump laser 36 to the fiber 26, and output couples the pseudo random pulse train 38. The input power delivered by the diode 36 is controlled through a controllable power source 42. The controllable power source is adjusted such that the optical power that is incident on the nonlinear reflector 32 exceeds the threshold, and can be further adjusted between a plurality of levels to select a specific number of pulses. The specific power levels will depend upon the particular laser configuration and the pumping efficiency.

Figure 5:
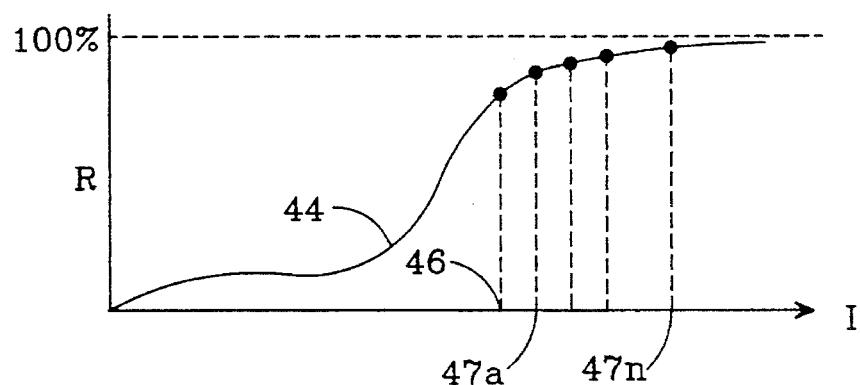
FIG. 5 is a plot of a characteristic reflectivity R v. intensity I curve for a nonlinear reflector.

FIG. 5 is a plot of the reflectivity R v. intensity I curve 44 for the nonlinear reflector. At very low power levels, the reflector absorbs most of the light and exhibits only a small preference for higher intensity pulses such that the laser produces a very inefficient CW output. At normal power levels, the curve is very steep so that the loss associated with the reflector becomes the dominant loss mechanism in the laser. Therefore, the lowest loss state of the laser is a single high intensity pulse.

At higher power levels the curve flattens out, resulting in a reduction in the reflector's effect on the overall loss of the laser to a point where a secondary loss mechanism, possibly attributable to fluorescence, becomes significant. These two loss mechanisms combine to produce a threshold intensity level 46 beyond which the laser emits multiple mode-locked pulses with random starting times during each laser period. The thresholds between successive numbers of pulses are designated by 47a–n. The precise value of the thresholds 46 and 47a–n, and their corresponding position on the curve 44 depend upon at least the shape of the curve, the period of the laser, the pulse width, the properties of the fiber and the power of the laser.

Figure 6:
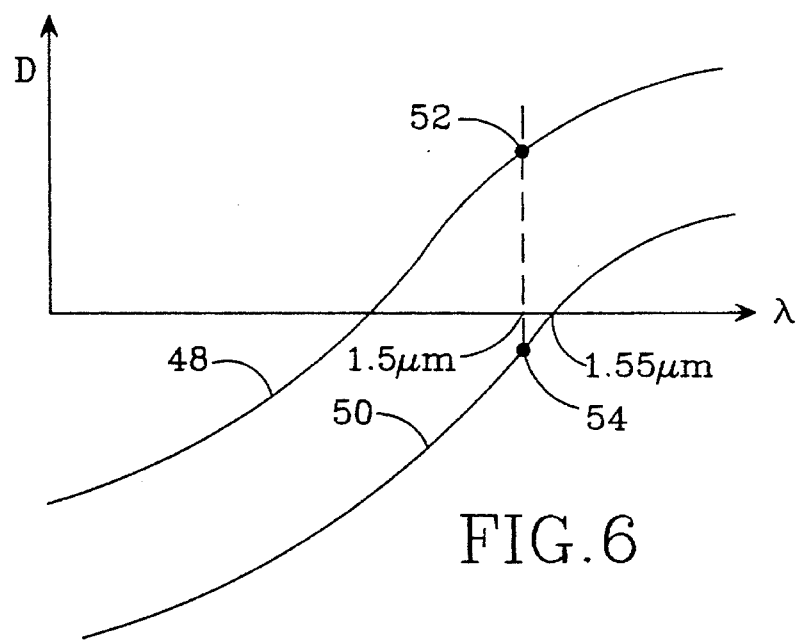
FIG. 6 is a plot of the dispersion coefficient D v. wavelength λ for an optical fiber and a dispersion shifted optical fiber.

FIG. 6 is a plot of the dispersion coefficient D v. wavelength $\lambda$ curves 48 and 50 for the optical fiber 26 and the dispersion shifted optical fiber 30, respectively. At the central wavelength of 1.5 μm, the dispersion coefficient 52 for the unshifted optical fiber 26 has a positive value. Typical unshifted fibers have a zero dispersion coefficient at approximately 1.3 μm. The unshifted optic fiber 26 is used because at the present time dispersion shifted fibers are not available with the erbium dopant used to provide the laser gain medium. Preferably, the two fibers would be replaced by a single dispersion shifted erbium doped fiber.

Since the DSF 30 is much longer than fiber 26, its dispersion coefficient 54 will dominate. In the preferred embodiment, the dispersion of fiber 30 is shifted such that the zero dispersion wavelength is greater than 1.5 μm, suitably 1.55 μm. Testing has shown that when the dispersion coefficient 54, and hence the overall dispersion coefficient are negative, the laser emits the desired pseudo random pulse train. However, when the DSF's dispersion coefficient is positive, the laser emits a plurality of regularly spaced pulses that are bunched together at the beginning of each laser period. The applicant do not know why this occurs, or if the result is limited to fiber optic lasers.

While several illustrative embodiments of the invention have been shown and described, numerous variations and alternate embodiment will occur to those skilled in the art. Such variations and alternate embodiments are contemplated, and can be made without departing from the spirit and scope of the invention as defined in the appended claims.

I claim:

1. A passively mode-locked laser, comprising:
    an optical resonant cavity that is capable of sustaining the oscillation of a plurality of resonant modes having respective phases;
    a saturable absorber that is positioned in the resonant cavity, said saturable absorber having a threshold beyond which a pseudo random pulse train is generated; and
    a pump that injects power into the resonant cavity at a level at which the optical intensity that is incident on the saturable absorber exceeds said threshold.

2. The passively mode-locked laser of claim 1, wherein said optical resonant cavity has a negative dispersion coefficient at said modes.

3. The passively mode-locked laser of claim 2, further comprising an optical filter that is positioned in said cavity to limit oscillation in said cavity to said modes.

4. The passively mode-locked laser of claim 1, wherein said optical resonant cavity comprises an optical fiber that is doped with an active gain medium.

5. The passively mode-locked laser of claim 4, wherein said optical fiber is a dispersion shifted optical fiber that has a negative dispersion coefficient at the resonant modes.

6. The passively mode-locked laser of claim 5, further comprising a grating that is imprinted on said fiber for limiting the oscillations in said fiber to said modes.

7. The passively mode-locked laser of claim 5, wherein one of the resonant modes is a central mode that has a wavelength of at least approximately $1.5^{-6}$ meters.

8. The passively mode-locked laser of claim 4, wherein said saturable absorber comprises a non-linear reflector that is positioned at one end of the optical fiber, the reflectivity of said reflector increasing as the incident optical intensity increases.

9. The passively mode-locked laser of claim 8, wherein said pump is a laser diode.

10. The passively mode-locked laser of claim 1, wherein the pseudo random pulse train has a plurality of periods, further comprising a controller for controlling the level of the pumping power between a plurality of levels to select the number of randomly spaced mode-locked pulses in each of said periods.

11. A passively mode-locked laser, comprising:
    an optical resonant cavity that is capable of sustaining the oscillation of a plurality of resonant modes with respective phases, said cavity having a loss mechanism that tends to distribute the laser energy over time;
    a saturable absorber that is positioned in the resonant cavity and tends to concentrate the laser energy in time by forcing the modes' phases to be approximately equal, said loss mechanism and said saturable absorber combining to establish a threshold beyond which a pseudo random pulse train is produced; and
    a pump that injects power into the resonant cavity at a level at which the optical intensity incident in the cavity exceeds said threshold.

12. The passively mode-locked laser of claim 11, wherein said optical resonant cavity has a negative dispersion coefficient at said modes.

13. The passively mode-locked laser of claim 12, wherein the pulse train has a plurality of periods, further comprising a controller for controlling the level of the pumping power between a plurality of levels to select the number of randomly spaced mode-locked pulses in each of said periods.

14. A passively mode-locked fiber optic laser, comprising:
    a first optic fiber having first and second ends, said fiber being doped to provide an active gain medium which is capable of sustaining the oscillation of a plurality of resonant modes having respective phases;
    a nonlinear reflector that is coupled to the first end of the fiber, said nonlinear reflector having a threshold beyond which a pseudo random pulse train is generated;
    an optical coupler that is coupled to the second end of the fiber for input coupling optical power into said fiber and output coupling said pseudo random pulse train; and
    a pumping laser diode that provides said optical power to said optical coupler at a level at which the optical intensity that is incident on the nonlinear reflector exceeds said threshold.

15. The passively mode-locked fiber optic laser of claim 14, wherein the pulse train has a plurality of periods, further comprising a controller for controlling the level of the pumping power between a plurality of levels to select the number of randomly spaced mode-locked pulses in each of said periods.

16. The passively mode-locked fiber optic laser of claim 14, further comprising a dispersion shifted optic fiber that is connected between said optic fiber and said nonlinear reflector, said dispersion shifted fiber having a negative dispersion coefficient at said modes.

17. The passively mode-locked fiber optic laser of claim 16, wherein said optic fiber and said dispersion shifted optic fiber are combined into a single dispersion shifted fiber.

18. A method for generating a pseudo random optical pulse train, comprising:

providing an active gain medium that is capable of emitting light at discrete frequencies;

amplifying the light at a plurality of modes;

distributing the optical energy over time as a function of optical intensity;

concentrating the optical energy in time as a function of optical intensity to establish a threshold beyond which said pseudo random pulse train is produced; and pumping said active gain medium with a sufficient amount of power so that the optical intensity exceeds said threshold.

19. The method of claim 18, wherein said pulse train has a plurality of periods, further comprising controlling the amount of pumping power to select the number of randomly spaced mode-locked pulses in each of said periods.

* * * * *